May 26, 1970 R. E. ADAMS 3,513,960
ACCUMULATOR CONVEYOR
Filed Jan. 17, 1968 2 Sheets-Sheet 1
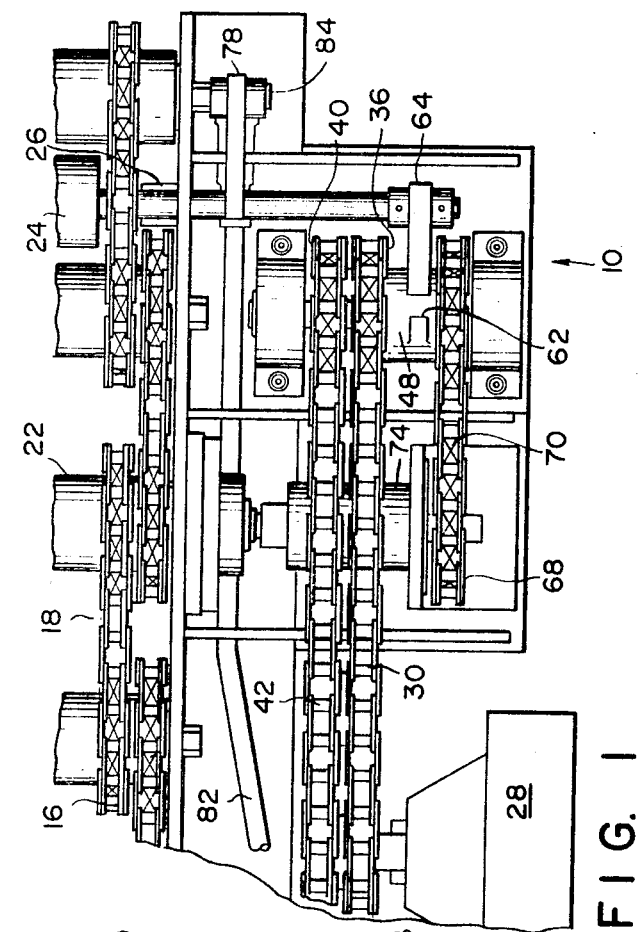
FIG. 1
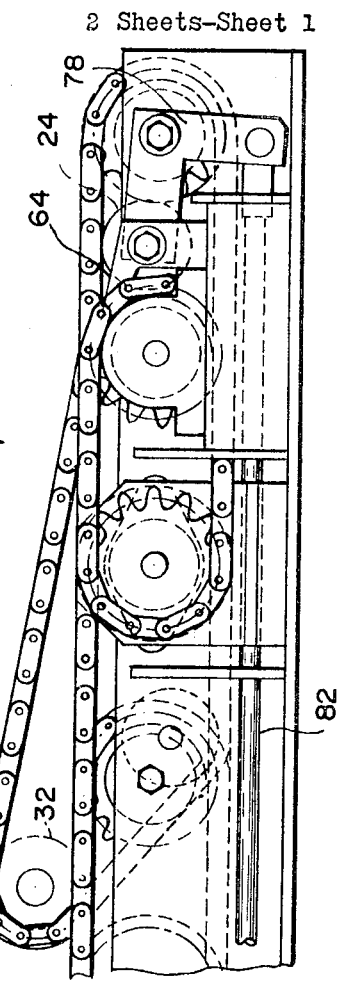
FIG. 2
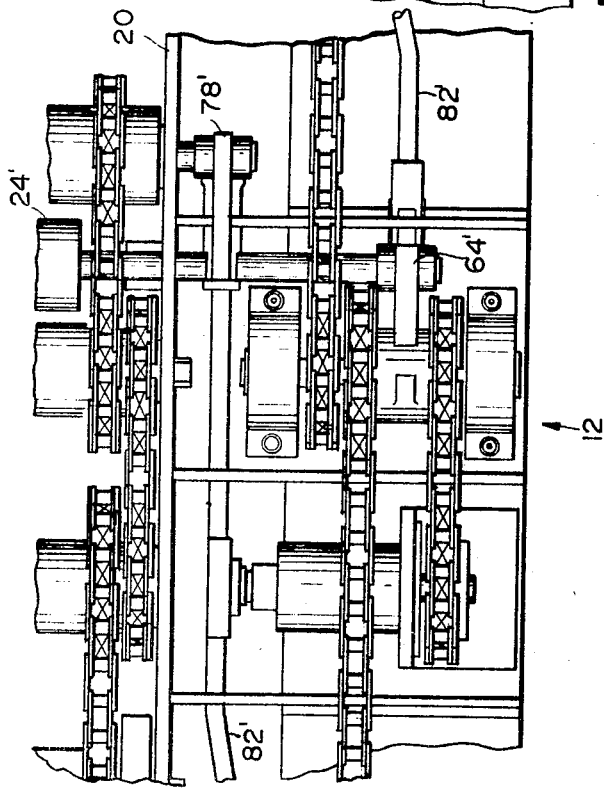
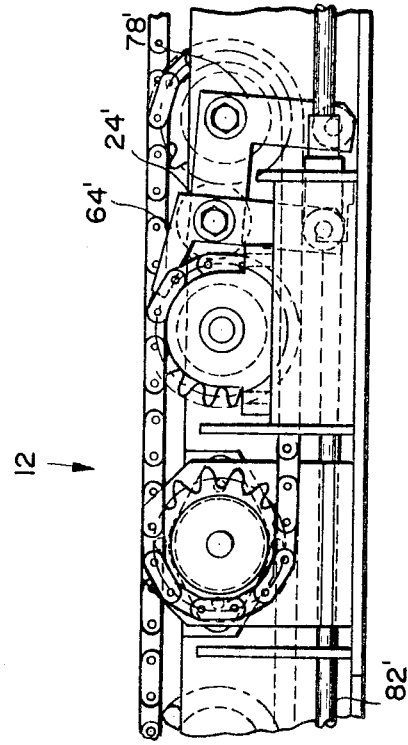

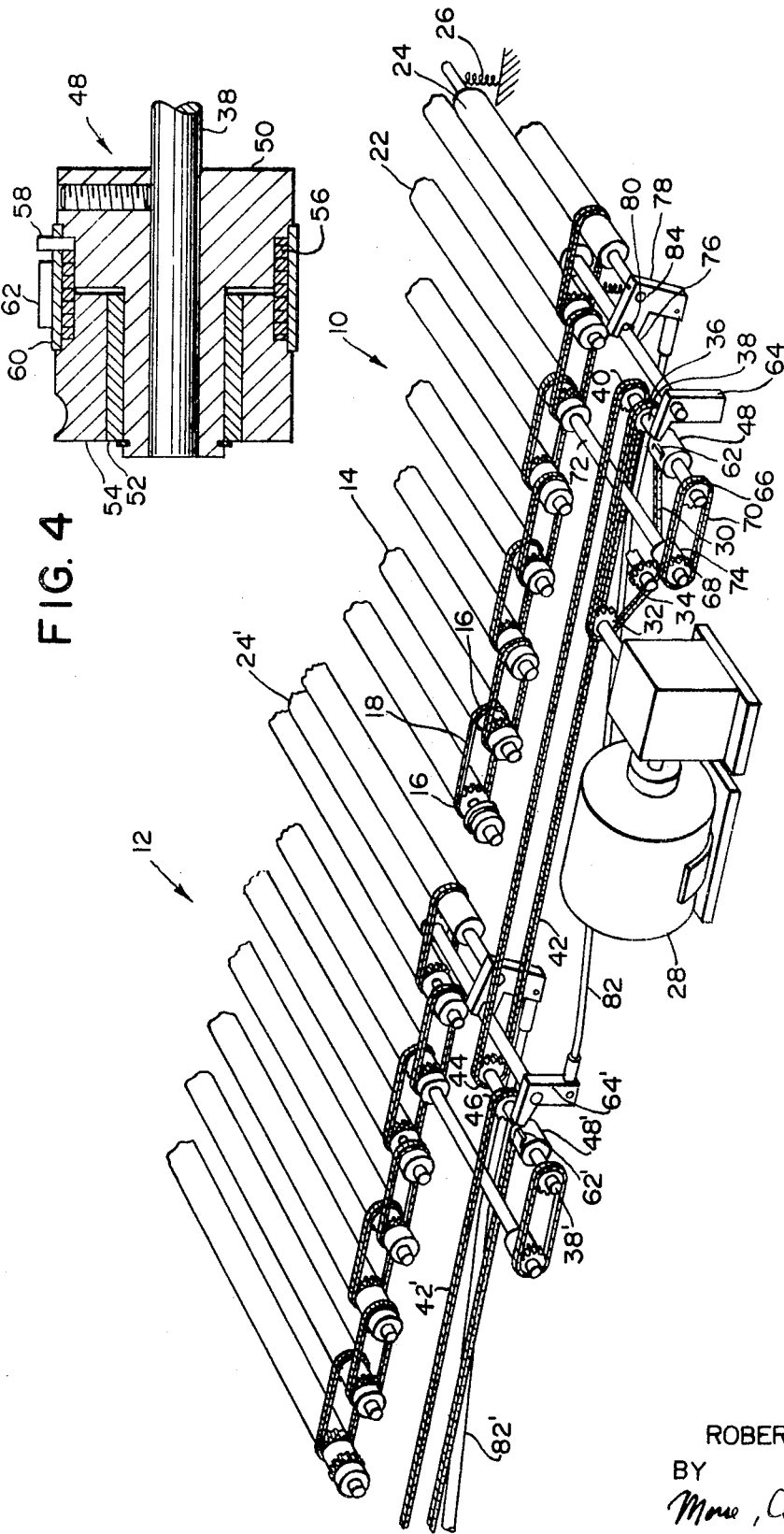

United States Patent Office 3,513,960
Patented May 26, 1970

3,513,960
ACCUMULATOR CONVEYOR
Robert E. Adams, Hudson, N.Y., assignor to Gifford-Wood, Inc., Hudson, N.Y., a corporation of Massachusetts
Filed Jan. 17, 1968, Ser. No. 698,458
Int. Cl. B65g 47/26, 13/02
U.S. Cl. 198—34     7 Claims

ABSTRACT OF THE DISCLOSURE

An accumulator conveyor is provided which has particular utility in the handling of heavy loads. The conveyor system is made up of consecutive stages, each stage comprising a set of load supporting rolls and an actuating roller adapted to operate a clutch mechanism which stops the drive for the rolls in its stage when there is a load on it and to condition the preceding stage to stop when a load travels onto it. The remainder of the conveyor will continue to run and accumulate loads with each succeeding stage stopping as loads accumulate. As the leading load is removed from the discharge or end stage the system causes the loads to advance incrementally while maintaining spacing between the loads.

BACKGROUND OF THE INVENTION

Field of the invention

This invention relates generally to conveyor systems and more particularly is directed towards a new and improved accumulator conveyor adapted to handle heavy loads and to accumulate and maintain spaced relation between loads.

Description of the prior art

Accumulator conveyors have been available in various forms in which conveyor sections stop as loads come to the end of the conveyor and accumulate before being removed. Accumulator conveyors heretofore available have been useful only for handling relatively light loads and have not been suitable for heavy or palletized loads for the reason that prior systems have employed friction drives which cause the loads to bank against one another and the driving members to wear rapidly. Prior systems of this type also have placed relatively severe strains on the driving motors and tend to produce undesirable vibrations in the system and on the loads. Accordingly, it is an object of the present invention to provide improvements in accumulator conveyors and more particularly to provide an accumulator conveyor capable of handling heavy loads smoothly and without significant wear on the driving parts or abuse to the loads.

SUMMARY OF THE INVENTION

The present invention features an accumulator conveyor comprising successive stages each with a set of load supporting rolls and each stage provided with an actuating roller adapted to respond to the presence of a load. The actuating roller, when depressed by the presence of the load, declutches the drive to the set of rollers and simultaneously conditions the mechanism for a preceding stage to declutch its drive mechanism when a load passes thereon. If no load is present on the first mentioned stage the drive mechanism will continue to provide positive driving action and the preceding drive system will also continue even though a load passes over it.

The clutches are controlled by levers operated by the actuating roller under the load. The clutch is positively disengaged upon actuation so that no pressure builds up on the accumulated items and there is no wear on the mechanism or piling up of the loads.

BRIEF DESCRIPTION OF THE DRAWINGS

FIG. 1 is a top plan view showing a portion of an accumulator conveyor made according to the invention,
FIG. 2 is a view in side elevation thereof,
FIG. 3 is a view in perspective somewhat schematic, of the invention, and
FIG. 4 is a sectional side elevation of a clutch mechanism.

DESCRIPTION OF THE PREFERRED EMBODIMENT

The accumulator conveyor system is comprised of consecutive stages with the last or discharge stage of a conveyor system indicated by reference character 10 in FIG. 3 and the next to last stage being indicated by reference character 12. It will be understood that as many additional stages as needed for a particular installation may be added as required. Each stage is comprised of a plurality of load supporting rollers 14, typically eight in number although this may be varied as is desired. Adjacent pairs of load supporting rollers 14 in each state are drivingly connected to one another by means of a sprocket gear 16 mounted to the end of each roller and in mesh with a driving chain belt 18 looped over each sprocket gear. The rollers themselves are supported at their ends to a frame 20. The rollers in each stage are driven by power transmitted through a single drive roller 22 in each stage. Each stage also includes a load sensing roller 24 preferably located between the last and next to the last load supporting rollers in each stage so that a load coming onto a particular stage will move up to the end of that stage before coming to a stop if that stage has been conditioned to stop. The load sensing roller 24 is not power-driven and is resiliently mounted as by springs 26 for limited vertical movement.

The drive system for the several stages of the conveyor includes a motor and reduction gear unit 28 providing continuous drive through a chain belt 30 looped over sprocket gears 32, 34 and 36. The sprocket gear 36 is fixed to an input shaft 38 which also has fixed thereto a sprocket gear 40. The sprocket gear 40 meshes with a chain belt 42 looped over a sprocket gear 44 in a similar drive system in the conveyor stage 12. Sprocket gear 44 is fixed to a similar input shaft 38' carrying a sprocket 46 driving a chain belt 42' for delivering power to the next preceding conveyor stage.

The input shaft 38 is drivingly connected to one side of a clutch 48, preferably of the on-off type such as shown in FIG. 4 and which is commercially available from Curtiss-Wright Corporation. The clutch 48 comprises a shaft adapter 50 secured to the input shaft 38 and having mounted thereon an annular bearing 52 rotatably supporting a mounting hub 54 which is connected to the output of the clutch. Wrapped about adjacent cylindrical surfaces of the hub 54 and the shaft adapter 50 is a helical spring 56 the left-hand end of which as viewed in FIG. 4 is secured to the hub 54 while the right-hand end has a projecting portion 58 engaging an annular release sleeve 60. The sleeve 60 is formed with a shoulder 62 which is adapted to engage the end of a pivoted lever 64. The clutch operates as follows; with the sleeve 60 and its shoulder 62 released the clutch is engaged with the spring 56 firmly coupling the shaft adapter 50 and the mounting hub 54. The output member or mounting hub 54 will turn at shaft speed. When the sleeve 60 is arrested by the lever 64 the clutch is disengaged by the action of the spring being slightly enlarged in diameter permitting the shaft adapter to rotate freely under the spring. Under these conditions the output hub 54 idles.

The output hub 54 of the clutch is drivingly connected to a sprocket gear 66 which in turn drives another sprocket gear 68 by means of a chain belt 70 looped over both sprocket gears.

The sprocket gear 68 drives the roller 22 through a shaft 72 and a backstop 74 which serves as a brake and prevents a load on the stage from coasting when the power is released.

The clutch actuating lever 64 is mounted on the end of arm 76 extending from one end of the load sensing roller 24. It will be understood that when a load moves onto stage 10 it will be carried along until it passes over the load sensing roller 24. The load will cause the roller 24 to depress to a position where the lever 64 will engage the shoulder 62 of the clutch 48 thus restraining the sleeve 60 and disengaging the clutch to stop power transmission to the rollers for the stage 10. When the load is removed from stage 10 the springs 26 will cause the roller 24 to rise up sufficiently to bring the lever 64 out of engagement with the shoulder 48 thus releasing the sleeve 60 causing the clutch to engage and again transmitting drive to the stage 10.

Each time the load detecting roller 24 is depressed it causes a bell crank 78 to pivot. This bell crank is formed at the end of its upper arm with a notch 80 which engages the extension arm 76 from the load detecting roller 24. The lower arm of the bell crank is connected to one end of a shipping rod 82 and the bell crank itself is pivotally mounted at 84 to an extension of the first load supporting roller in the stage. The opposite end of the shipping rod 82 is connected to the lower end of a clutch actuating lever 64′ for the preceding conveyor stage 12.

Each time the load sensing roller 24 for the stage 10 is depressed by a load moving onto the stage not only is the drive for the stage 10 declutched but also the bell crank 78 is pivoted to set the lever 64′ for the preceding stage 12 into a position where it will declutch the drive for the stage 12 when a load moves onto that stage and depresses the load sensing roller 24′.

The operation of the system is as follows; a load moves from left to right as viewed in FIGS. 1, 2 and 3 to the end of the conveyor without interruption. At the end of the conveyor, which is stage 10, the load typically including a pallet will depress the sensing roller 24 which is held in an elevated position approximately ¼ inch above the load supporting rollers 14 by means of the springs 26. When the load sensing roller is depressed the lever 64 moves downward and bears against the shoulder 62 for the clutch 48 causing the clutch to disengage. The conveyor stage 10 under the load is now disconnected. The load is stopped and there is no further power transmission to stage 10. In the same operation the preceding conveyor stage 12 is set up to stop when a second load depresses the load sensing roller 24′. Thus when the first load depressed sensing roller 24 the arm 76 moved downward turning the bell crank 78 which operated the shipping rod 82 which turned lever 64′ on the stage 12 so that it would be in a position to bear against the shoulder 62′ for the clutch 48′ causing it to declutch when sensing roller 24′ was depressed. If a load were not on stage 10, the shipping rod 82 would hold lever 64′ for the stage 12, and so on down the line, in a position where it would not affect the clutch even though its associated sensing roller were depressed. Therefore, when the second load depressed sensing roller 24′ the roll shaft would move downward operating bell crank 78′ but lever 64′ would not cause the clutch 48′ to disengage. As each load accumulates and depresses its load sensing roller the shipping rod 82 sets up lever 64 for each preceding conveyor stage so that when each preceding load sensing roller is depressed lever 64 will disengage clutch 48 in each case. Conversely, when the first load is removed from stage 10 and the sensing roller 24 moves upward, the lever 64 moves upward and the clutch 48 is engaged and power is transmitted to the conveyor stage 10. At the same time the shipping rod 82 operates the lever 64′ for the preceding conveyor stage 12. At this point bell crank 78′ is still held by the load directly overhead on its sensing roller 24′. However, the conveyor is started and as soon as the second load moves off sensing roller 24′ bell crank 78′ will turn, operating shipper rod 82′ which causes the clutch on the next preceding conveyor stage to engage and so on down the line. If it is required that the first load continue on by signal then the lever 64 may be operated by a solenoid which will allow the clutch 48 to engage and start conveyor stage 10.

Each load, therefore, starts in succession starting with the first load. This evens the strain on the drive motor 28 and maintains separation between loads. The levers in the system move a very small distance on the order of ¼ inch or so, and are very lightly loaded. The lever 64 does not have to hold the clutch 48 but merely to disengage it.

In the system only one operating motor is needed and this continues to run as the loads accumulate and the stages directly under each load actually stop. The arrangement produces no friction or overload on the motor and this prevents vibrating the loads. Spacing of the load sensing rollers 24, 24′, etc., will determine the separation of the loads which in turn keeps the loads from colliding and enables each load to be lifted without interference from its adjoining load. No operating switches or electric eyes are required and only one motor starter is needed. Since the levers are lightly loaded and have a small motion they are substantially maintenance free. If desired, an electric eye at the discharge end of the conveyor may be provided to stop the conveyor during the unloading operation. This means that the conveyor will merely start where it left off and the conveyor will only have to start with one load unless, of course, there are several loads in motion along the length of the conveyor. While it is normally desirable to maintain loads separate and prevent collision between loads under certain circumstances the loads may be made to bank against one another by changing the spacing between the sensing rollers.

Having thus described the invention what I claim and desire to obtain by Letters Patent of the United States is:

1. An accumulator conveyor for handling discrete loads, comprising
   (a) at least a pair of conveyor stages arranged in adjacent relation to one another,
   (b) each of said stages including at least one normally driven load supporting roller and a resiliently mounted load sensing member,
   (c) a normally engaged clutch operatively connected to said roller,
   (d) power means operatively connected to said clutch,
   (e) clutch actuating means responsive to movement of said sensing member and adapted to disengage said clutch when said sensing member is moved by a load and to engage said clutch when released,
   (f) control means responsive to the movement of said sensing member for one stage and adapted to set the clutch actuating means for a preceding stage to disengage the clutch for said preceding stage only when a load is on both of said stages,
   (g) said driven load roller of each stage is drivingly connected to said power means when the clutch actuating means of that stage is engaged, said load is moved to a succeeding stage by said driven load roller.

2. An accumulator conveyor according to claim 1 wherein said power means is drivingly connected to the clutches in each stage of said conveyor.

3. An accumulator conveyor according to claim 1 wherein said load sensing member is a roller mounted parallel to said load supporting roller.

4. An accumulator conveyor according to claim 1 wherein each stage includes a plurality of parallel load supporting rollers drivingly connected to one another.

5. An accumulator conveyor according to claim 1 wherein said clutch actuating means includes a pivotally mounted member having a clutch contacting portion normally out of contact from said clutch and adapted to normally contact said clutch and cause disengagement thereof by movement of said load sensing member, said pivotally mounted member being connected to said control means and adapted to be pivoted thereby out of clutch contacting position upon movement of a load sensing member in a subsequent stage.

6. An accumulator conveyor according to claim 1 wherein said control means includes a pivotally mounted bell crank connected to said load sensing roller and adapted to pivot upon movement of said load sensing roller and an elongated member connected to the bell crank for one stage and the clutch actuating means in preceding stage.

7. An accumulator conveyor for handling discrete loads, comprising
  (a) at least a pair of conveyor stages arranged in adjacent relation to one another,
  (b) each of said stages including a plurality of drivingly connected load supporting rollers and a resiliently mounted load sensing roller,
  (c) a normally engaged clutch operatively connected to said load supporting rollers,
  (d) power means operatively connected to said clutch,
  (e) a lever pivotally mounted to said sensing roller and movable therewith and adapted in one pivoted position to contact said clutch and cause disengagement thereof when said sensing roller is depressed and moved out of contact with said clutch when in a raised position and cause engagement thereof,
  (f) a pivotally mounted bell crank connected to said load sensing roller and adapted to pivot upon movement thereof,
  (g) an elongated member connected to the bell crank for one stage and the lever for another stage to position the lever to contact and disengage the clutch for a preceding stage only when a load is on both said stages,
  (h) said plurality of load supporting rollers of each stage are drivingly connected to said power means when the clutch of the corresponding stage is engaged, said load is moved to a succeeding stage by said load supporting rollers.

References Cited
UNITED STATES PATENTS

| | | | |
|---|---|---|---|
| 3,066,788 | 12/1962 | Christiansen | 198—34 |
| 3,116,823 | 1/1964 | Schneider | 198—160 |
| 3,136,406 | 6/1964 | DeGoode et al. | 198—160 |
| 3,170,561 | 2/1965 | Schneider | 198—160 X |

HUGO O. SCHULZ, Primary Examiner

U.S. Cl. X.R.

198—127